United States Patent Office 3,522,562
Patented Aug. 4, 1970

3,522,562
MAGNETIC RELAY STRUCTURE HAVING PLURAL OPERATIVE MAGNETS
Adolf Schön, Grossglocknerstrasse 2C, Socking, near Starnberg, Germany, and Hugo Angermaier, St. Quirinplatz 7, Munich, Germany
Filed Feb. 27, 1967, Ser. No. 618,623
Claims priority, application Germany, Feb. 28, 1966, S 102,282
Int. Cl. H01h 51/22, 51/28
U.S. Cl. 335—153                    12 Claims

ABSTRACT OF THE DISCLOSURE

A magnetic relay structure wherein plural magnets are arranged on the same side of the relay contacts. A first permanent magnet, and a second permanent magnet, the latter being repolarizable between bistable states of magnetization, are mounted adjacent each other. Further, the first permanent magnet is magnetically coupled to one contact arm of the relay structure, precluding the necessity for utilization of a magnetic flux conductor connected therebetween. Repolarization means are provided, whereby electrical pulses produced thereby selectively repolarize the second permanent magnet as desired, to produce a magnetic field which is either additive or subtractive to the magnetic field produced by the first permanent magnet. The net magnetic field produced, functions to selectively activate or deactivate the relay contact.

CROSS REFERENCE TO RELATED APPLICATION

Applicant claims priority from corresponding German application Ser. No. 102,282, filed on Feb. 28, 1966.

BACKGROUND OF THE INVENTION

Field of the invention

This invention relates to a magnetic relay structure, and more particularly, to the arrangement of the permanent magnets comprising the relay structure so as to minimize space requirements. Two permanent magnets are used in conjunction with each relay structure and are arranged on the same side of the relay contacts, to minimize the necessity for ultilization of additional elements such as magnetic flux conductors. The relay has particular adaptability for use in spacially small areas, such as in telephone installations.

Description of the prior art

The prior art teaches utilization of a plurality of permanent magnets to bias relay structures, and also provides repolarizable permanent magnets to selectively actuate relay contacts as desired.

Further, hermetically sealed ferrite relays are also known, which employ a repolarizable permanent magnet which may be polarized between bistable states of magnetization by an exciter winding. The repolarizable permanent magnet is utilized in conjunction with a second high coercive force permanent magnet, to effect a net magnetic field to selectively activate and deactivate the relay contact. Ferrite relays have been found to be advantageous over adhesion relays which comprise only one permanent magnet, since they have a higher functional reliability, and also are more dependable because the strength of the second permanent magnet is not absolutely determinative of contact opening and closing. Further, the current pulses that effect repolarization of the repolarizable magnet control the relay, relatively independent of mirror strength tolerances in the magnetic field of the second permanent magnet.

A ferrite relay of the type described is illustrated in NTZ (Nachrichtentechnische Zeitschrift) 1965, Issue 4, pp. 202–204, FIGS. 4–12. Therein, a first permanent magnet is arranged on one side of the relay contacts, and a second permanent magnet is arranged on the other side of the relay contacts. This requires a considerable amount of installation space, because the two-sided arrangement of the permanent magnets requires a correspondingly large dimensioning of the relay. Further, the arrangement illustrated requires at least three magnetic flux conductor elements to complete the magnetic coupling between the two permanent magnets and the magnetic circuit. However, its is known that one of the magnetic flux conductors can be eliminated, but this necessitates the utilization of larger and correspondingly costlier high coercive permanent magnets.

The utilization of a plurality of such magnetic flux conductor elements not only increases manufacturing costs, but also complicates assemblage of the relay and the support construction involved. Further, the arrangement has an additional disadvantage since the two-sided arrangement of the permanent magnets, requires that mounting elements must also be provided on both sides of the contact to support the permanent magnets.

It has also been known that with the two-sided arrangement of the permanent magnets, difficulties arise because narrow tolerances are required to obtain saturated magnetic connections on both sides of the relay contact, and thereby ensure operation of the relay.

SUMMARY OF THE INVENTION

These and other objections and defects of the prior art are solved by the present invention, which substantially reduces the number of elements comprising the basic relay structure, thereby effecting considerable savings in space and manufacturing costs.

The invention disclosed herein utilizes two permanent magnets, a high coercive force permanent magnet, and a repolarizable permanent magnet, arranged on same side of the contact arms comprising the relay contact. The contact arms define an air gap therebetween, whereby development of a magnetic field across the air gap of sufficient strength actuates or closes the contact.

The high coercive force permanent magnet is positioned adjacent the air gap, and is directly magnetically connected to the first contact arm. This eliminates the necessity for utilization of a magnetic flux conductor coupler, therebetween and results in a substantial savings in space. The repolarizable permanent magnet is magnetically connected to the high coercive force permanent magnet, and comprises an elongated magnet arranged asymmetrically to the relay contact. By utilizing a repolarizable permanent magnet of this type, the width of the magnet can be substantially minimized, to provide an arrangement which allows a sufficient number of windings, and simultaneously a relatively small coil diameter. Further, the high coercive permanent magnet can be made relatively small in size, since it then has a relatively short flux path. A magnetic flux conductor is utilized to magnetically connect the second contact arm to the repolarizable permanent magnet to complete the magnetic circuit and is preferably shaped similarly to the high coercive force permanent magnet.

Further, the first and second contact arms are made sufficiently long, and are connected respectively to the high coercive force permanent magnet and to the magnetic flux conductor, such that the junctions are between relatively motionless parts, thereby providing a rigid magnetic connection which effects maximum magnetic flux conduction efficiency.

One embodiment of the invention comprises a substantially H-shaped housing, the two arms thereof respectively supporting in locked position the high coercive force permanent magnet and the magnetic flux conductor. The repolarizable permanent magnet is connected between the high coercive permanent magnet and the magnetic flux conductor in the cross path between the two arms. This construction further enables the repolarizable permanent magnet to be utilized in operable conjunction with two relay structures, the associated high coercive force permanent magents and magnetic flux conductors being connected on alternate sides of the repolarizable permanent magnet, and magnetically coupled to their associated relay contacts. This particular arrangement serves to still further minimize the number of elements necessary to effectively actuate the relays, resulting in a substantial savings of space and manufacturing costs.

Further, the arrangement thus described can be varied to effect actuation of the relay structures either simultaneously or individually, depending upon the polarization state or condition of the repolarizable permnent magnet. In this regard, a source of electrical pulses as known in the art, is utilized to repolarize the permanent magnet to the polarized magnetization state desired, depending upon whether the magnetic field produced by the repolarizable permanent magnet is additive or subtractive to the magnetic fields produced by the high coercive force permanent magnets comprising the relay arrangement, associated relays are either actuated or deactuated. That is, the combined magnetic strength of the repolarizable permanent magnet and the high coercive force permanent magnet associated with each relay structure is necessary to effect actuation of the relay contact.

Several advantages are achieved by this invention over the prior art. For example, the relay developed according to this invention requires approximately half the installation space required by prior art relays. Thus, the two permanent magnets can be arranged on the same side of the relay contacts such that the space required does not exceed the space normally required for a single permanent magnet. This is accomplished by connecting the high coercive force permanent magnet directly to the repolarizable permanent magnet.

The invention also minimizes the number of elements required to complete the magnetic circuit. Thus, only one magnetic flux conductor is utilized in several of the embodiments of the invention, eliminatng complicated mounting structure. Instead, a simplified housing structure defining a plurality of cut-outs to supportably position the permanent magnets and the single magnetic flux conductor means is utilized.

DETAILED DESCRIPTION OF THE INVENTION

Figure 1:
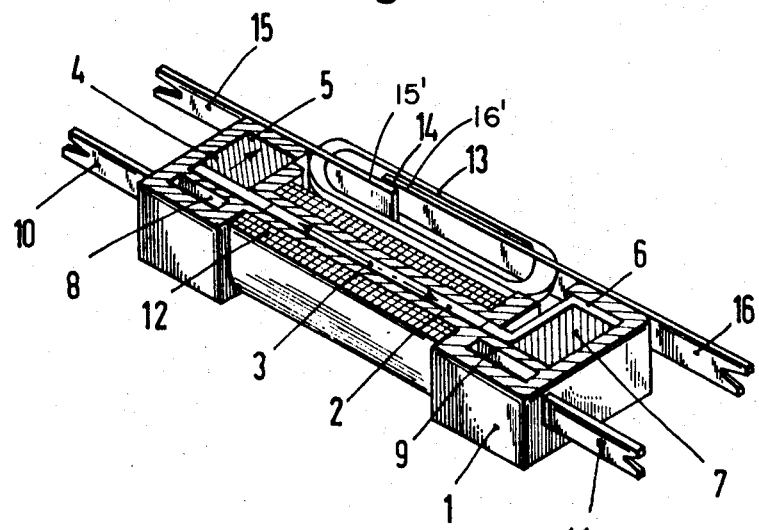
FIG. 1 is a perspective, partial-sectional view of a basic relay structure.

FIG. 1 shows in perspective, partial-sectional view, a relay structure having a non-magnetizable H-shaped housing 1, which may comprise a conventional plastic material. Housing 1 defines chamber 2 which supportably positions permanent magnet 3; chamber 4, which supportably positions elongated permanent magnet 5; and chamber 6, which supportably positions magnetic flux conductor 7. Grooves 8 and 9 are defined by opposite arms of housing 1 and electrical connectors 10 and 11 are respectively fitted through grooves 8 and 9, for connection to repolarization winding 12, which is wound around permanent magnet 3.

Protective enclosure 13 is substantially cylindrical in shape and is hermetically sealed; and, it may contain an inert gas. Electrical connectors 15 and 16 project through enclosure 13, and comprise complementary contact arms at ends 15' and 16', respectively, across air gap 14, thereby forming a dry reed switch. It is seen that permanent magnets 3 and 5 are asymmetrically located relative to the longitudinal axis of the dry reed switch, to the same side thereof. Further, connector 15 is directly magnetically connected to one pole of permanent magnet 5, and connector 16 is directly magnetically connected to one end of magnetic flux conductor 7.

Permanent magnet 3 comprises material that is remanently magnetic upon deenergization of repolarization winding 12, the latter polarizing permanent magnet 3 to produce the magnetic field direction desired. Thus, permanent magnet 3 is a bistable permanent magnet, which may be repolarized, as desired, to produce magnetic fields having magnetic flux flows indicated by the solid and broken line arrows of FIG. 1. Further, when permanent magnets 3 and 5 are polarized in the same direction such that their magnetic fields are additive, the net or total magnetic field developed across contact arms 15' and 16' is sufficient to actuate said arms and effect contact therebetween.

The relay structure shown in FIG. 1 operates in the following way Contact 15/16 is maintained in open or rest position, because connectors 15 and 16 inherently tend to remain unbent. However, assuming contact 15/16 is open, and that permanent magnets 3 and 5 are polarized in the same direction, contact 15/16 is closed. That is, the magnetic field developed across air gap 14 is then of sufficient strength to magnetize and actuate ends 15' and 16' of respective connectors 15 and 16 towards one another. Energization of winding 12 by a current pulse that repolarizes permanent magnet 3 is utilized to deactivate or open contact 15/16. Thus, repolarization of permanent magnet 3, such that it has magnetic remanence that produces a magnetic field of opposite magnetic polarization to permanent magnet 5, causes the respective magnetic fields to subtract; the net or total magnetic field developed across air gap 14 is then of insufficient strength to maintain contact 15/16 in closed position because the inherent counterforce tending to return connectors 15 and 16 to the open position is greater than the net magnetic force; contact 15/16 is thereby opened.

It is thus seen that repolarization winding 12 is utilized only to repolarize permanent magnet 3 to the desired magnetic remanent state or condition. The current pulses energizing winding 12, can be of time durations substantially shorter than that necessary to effect actuation of contact 15/16 since the combined magnetic strength of permanent magnets 3 and 5 are sufficient to close the contact when polarized in the same direction. However, it is necessary that the pulse duration be sufficiently long such that permanent magnet 3 is properly repolarized to the desired magnetic remanent state.

Figure 2:
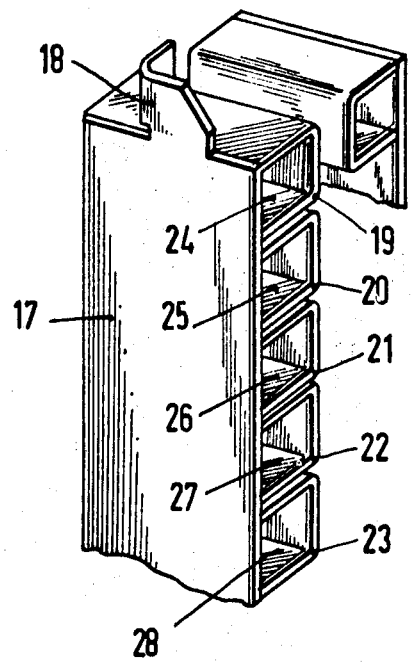
FIG. 2 is a partial isometric view showing an arrangement of a plurality of basic relay structures arranged in individual casings mounted to a common support.

FIG. 2 illustrates a portion of a housing which may be utilized to house a plurality of relay structures. Side wall 17 comprises a nonmagnetic material with flanged L-shaped extended section 18 extending therefrom to position the housing on support means. A plurality of U-shapel flanged sections 19–23 comprising magnetizable material, are affixed to sidewall 17, by conventional soldering or welding methods. Chambers 24-28 are defined, respectively, by flanged sections 19-23, to house individual relay structures. Thus, the magnetic fields of the individual relays are concentrated within the housings and are effectively isolated from each other, so that magnetization of one relay structure does not effect actuation of the contacts comprising other relays. Therefore, a plurality of relays can be conveniently and easily arranged in a small space, while avoiding the possibility of magnetic interaction therebetween.

Figure 3:
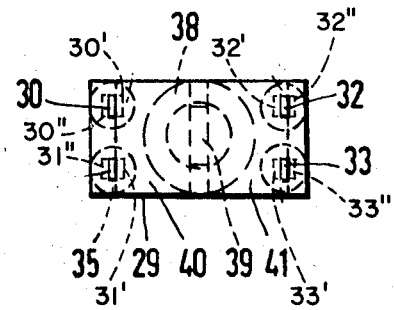
FIG. 3 is an end view of an embodiment of the invention in which a plurality of relay structures utilizing one repolarizable permanent magnet are shown.

FIG. 3 illustrates in end view a configuration comprising a plurality of basic relay structures, wherein a single repolarizable permanent magnet 39 is provided to effect actuation of associated relay contacts. Housing 29 comprises non-magnetic material 29, with relay contact arms positioned on each side of the bistable repolarizable magnet 39. Protective enclosures 30-33, similar to protective enclosure 13 illustrated in FIG. 1, are positioned in two rows of two enclosures each, on the side of permanent magnet 39. Further, permanent magnet 40 is magnetically connected between repolarizable magnet 39, and contact arms 30' and 31' of protective enclosures 30 and 31, respectively. Permanent magnet 41 is magnetically connected between repolarizable magnet 39 and contacts 32' and 33', of protective enclosures 32 and 33, respectively. Contact arms 30'', 31'', 32'', and 33'', are provided to effect connection between associated contact arms 30', 31', 32', and 33', respectively, when repolarizable magnet 39 and permanent magnets 40 and 41 are polarized in the same direction to produce additive magnetic fields.

The magnetic fields described are completed through magnetic flux conductors (not illustrated) magnetically coupled between repolarizable magnet 39 and relay contacts 30'', 31'', 32'' and 33'', respectively. It is thus seen that a plurality of relay structures can be combined in an arrangement, reducing the number of elements comprising the magnetic circuit, thereby minimizing space requirements and manufacturing costs.

Figure 4:
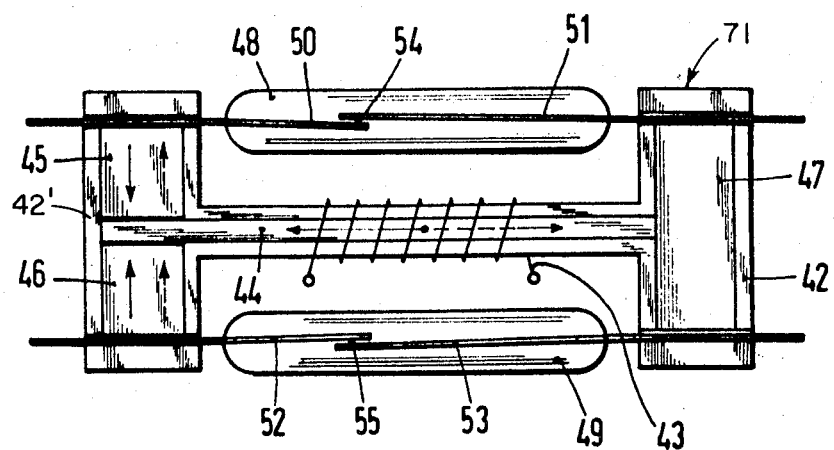
FIG. 4 is a sectional view of a relay arrangement utilizing two relay structures connected on either side of the repolarizable permanent magnet, with a common magnetic flux conductor shared by the two relay structures.

FIG. 4 shows an embodiment of the invention, wherein a plurality of basic relay structures are utilized in conjunction with one magnetically repolarizable permanent magnet. H-shaped housing 71 comprises nonmagnetizable material, with repolarizable permanent magnet 44 supported in the crosspath joining arms 42 and 42'. Coil 43 is wound around repolarizable permanent magnet 44, and is selectively energizable to cause polarization of permanent magnet 44 in the direction desired. As discussed in relation to FIGS. 1-3, repolarizable permanent magnet 44 is remanently magnetic, upon deenergization of coil 43.

Permanent magnets 45 and 46 are supportably positioned in arm 42' of H-shaped housing 71 and are polarized such that equal and opposite magnetic poles are adjacent to permanent magnet 43; this is indicated by the solid line arrows of FIG. 4. A single magnetic flux conductor conductor 47 is supported in arm 42, and completes the magnetic flux flow circuit. Sealed protective enclosures 48 and 49, preferably are air evacuated and filled with an inert gas. Electrical connectors 50 and 51, and 52 and 53, respectively, comprise complementary contact arms for the two relay structures illustrated. Air gaps 54 and 55 are defined between contact arms 50 and 51, and between contact arms 52 and 53, respectively, of relays 48 and 49.

When permanent magnets 44-46 are polarized to produce magnetic fields to effect the magnetic flux paths indicated by the solid line arrows, the relays operate as follows. The magnetic fields developed across air gaps 54 and 55, through magnetic flux conductor 47, permanent magnet 44, and permanent magnets 45 and 46, are not sufficient to overcome the inherent inertia normally holding contacts 50/51 and 52/53 open. However, when permanent magnet 44 is repolarized to produce a magnetic field having a magnetic flux direction which is additive to the magnetic fields produced by permanent magnets 45 and 46, corresponding net magnetic fields are developed across air gaps 54 and 55, which are sufficiently strong to close contacts 50/51 and 52/53. As discussed in relation to FIG. 1, and the relay structure defined therein, repolarization of permanent magnet 44 is achieved by the selected energization of winding 43 by current pulses of opposite polarity to the intial current pulses.

The heretofore described polarization of permanent magnets 45 and 46 produce simultaneous closure of contacts 50/51 and 52/53. However, it is also possible for permanent magnets 45 and 46 to be polarized in the same direction, as illustrated by the broken line arrows of FIG. 4. Under these conditions, only one of the relays will be closed at any one time, because at any one time repolarizable permanent magnet 44 will produce a magnetic field that is additive to the magnetic field produced by one of permanent magnets 45 and 46, but that is subtractive to the other. In the case, where the magnetic fields are additive, the corresponding relay will be actuated; where the magnetic fields are subtractive, however, the magnetic field developed across the associated air gap will be insufficient to overcome the inherent counterforce tending to maintain the contact open. Repolarization of permanent magnet 44 in the opposite direction, will effect a reversal of the positions of the relay contacts.

For example, if repolarizable permanent magnet 44 is polarized to effect a magnetic field having the direction indicated by the solid line arrow, and permanent magnets 45 and 46 are polarized to effect magnetic fields having directions also shown by the solid line arrows, contacts 50/51 or 52/53 will not be actuated. However, repolarization of permanent magnet 44 to effect a magnetic field having the direction illustrated by the broken line arrow, will produce a magnet field which is additive to the magnetic fields produced by permanent magnets 45 and 46. This will cause relays 50/51 and 52/53 to be actuated accordingly. Of course, polarization reversal of both magnets 45 and 46, will result in contact 50/51 being actuated when permanent magnet 44 is polarized to produce a magnetic field having the direction indicated by the solid line arrow; thereafter, repolarization of permanent magnet 44 to effect a magnetic field direction given by the broken line arrow, will close contact 52/53 and open contact 50/51.

It is thus seen that various modes of operations of a plurality of relay structures can be effected by reversing the polarization of permanent magnets 45 and 46, in association with repolarization of permanent magnet 44 to produce a plurality of interacting magnet relationships, to effect desired relay actuations. For example, in a two relay structure, both relays can be actuated simultaneously, or the relays can be actuated separately and alternately.

Repolarization of permanent magnet 44 by selective energization of winding 43 causes permanent magnet 44 to develop remanent magnetism having the desired magnetic flux flow-direction. The remanent magnetism, when additive to the magnetic fields produced by permanent magnets 45 and 46, develops a net magnetic field across the associated air gaps to close the contacts. Winding 43 is energized only for a time sufficient to effect repolarization of permanent magnet 44 to the desired mode of operation, that is, to develop a magnetic field having the desired direction. Therefore, actuated contacts remain closed upon deenergization of winding 43, until a current pulse of such polarity as to effect repolarization of permanent magnet 44 is fed to coil 43. Thereupon, repolarization of permanent magnet 44 effects a change in the direction of its magnetic field, and when it is subtractive to the magnetic fields produced by permanent magnets 45 and 46, the net magnetic fields across the associated air gaps are insufficient to maintain the contacts in open position.

It is therefore seen that the current pulses fed to winding 43 function to repolarize permanent magnet 44. The electromagnetic field it produces, however, is *not* essential to produce a magnetic net field of sufficient strength to overcome the inertia of the contacts which tends to maintain the contacts in the open position.

Figure 5:
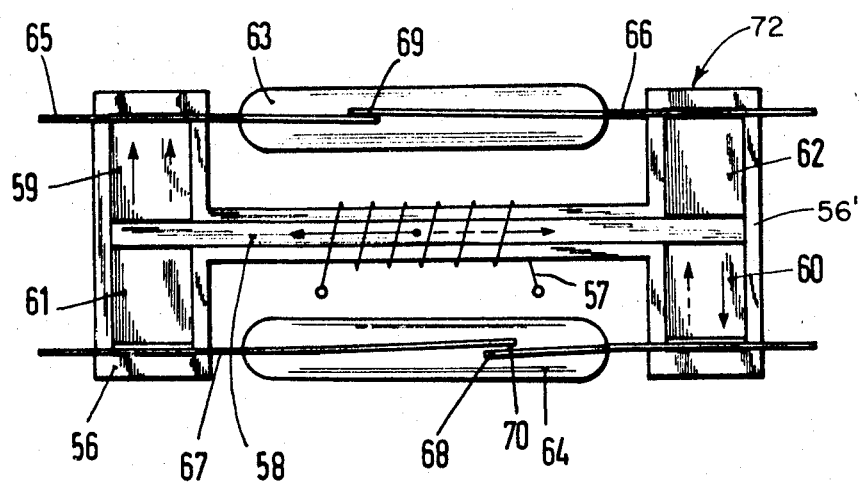
FIG. 5 is a sectional view of another embodiment of the invention, illustrating the arrangement of a plurality of relay structures utilizing one repolarizable permanent magnet, in a symmetrical arrangement of high coercive force permanent magnets and magnetic flux conductors.

FIG. 5 shows another embodiment of the invention, wherein the permanent magnet structure is varied from that illustrated in FIG. 4. Thus, in FIG. 5, two relay structures are illustrated, with permanent magnets 59 and 60 diametrically spaced from each other. This necessitates the use of two magnetic flux conductors, 61 and 62, instead of the one magnetic flux conductor 47 illustrated in FIG. 4.

In FIG. 5, non-magnetic H-shaped housing 72 supportably positions repolarizable permanent magnet 58. By selective energization of coil 57 by current impulses, repolarizable permanent magnet 58 can be made to assume bistable magnetic polarized states. Protective housings 63 and 64 are provided to house the relay contacts. Contact arms 65 and 66 define air gap 69 therebetween; and contact arms 67 and 68 define air gap 70 therebetween. Additionally, two permanent magnets 59 and 60 are arranged diametrically opposite each other in opposite arms 56 and 56', respectively, of housing 72. Magnetic flux conductors 61 and 62 also are diametrically supportably positioned in opposite arms 56 and 56' of H-shaped housing 72, and are similar in size and shape to permanent magnets 59 and 60.

The operation of the embodiment illustrated in FIG. 5, is similar to that discussed in FIG. 4. For example, when permanent magnets 58, 59, and 60 are polarized to produce magnetic fields as indicated by the solid line arrows, the magnetic field produced by permanent magnet 58 will be additive to the magnetic field produced by permanent magnet 59, but will be subtractive to the magnetic field produced by permanent magnet 60. Therefore, contact 65/66 will be closed since the magnetic field developed across air gap 69 in the magnetic circuit from permanent magnet 58, permanent magnet 59, air gap 69, magnetic flux conductor 62, and the return path to repolarizable permanent magnet 58, will be sufficient to countereffect the inherent inertia of contact arms 65 and 66 which tends to maintain them in the open position. However, the magnetic field across air gap 70, via permanent magnet 58, magnetic flux conductor 61, air gap 70, permanent magnet 60, and the return path to repolarizable magnet 58 will not be sufficient to countereffect the inherent inertia of contact arms 67 and 68 which tends to maintain contact 67/68 open. Therefore, contact 67/68 will not be closed.

Reversal of the polarization of permanent magnets 58, and 60, while maintaining the same polarization of permanent magnet 59, so that permanent magnets 58, 59 and 60, have magnetic fields directed as shown by the broken line arrows, will effect no contact actuation because the magnetic field developed by permanent magnet 58 will then be subtractive to the magnetic fields developed by permanent magnets 59 and 60.

However, it is seen that, repolarization of permanent magnet 58, so that it has a magnetic field directed as illustrated by the solid line arrow, while permanent magnets 59 and 60 have magnetic fields directed as illustrated by the broken line arrows, will cause actuation of relay contacts 65/66 and of relay contacts 67/68.

The relay arrangement of FIG. 5 is particularly desirable because of its symmetrical construction, which substantially reduces manufacturing costs. It is apparent that various modifications can be made in the magnetic polarization of the three permanent magnets, to effect selective actuation of the relay contacts, either simultaneously, or individually, depending upon the polarization of the permanent magnets.

What is claimed is:
1. A magnetically actuable relay structure comprising:
   first bistable magnetization means having remanent repolarization characteristics (3) to produce a first magnetic field,
   second magnetization means (5) to produce a second magnetic field,
   contact means (15, 16),
   a support device to support the first and second magnetization means, and the contact means, comprising an H-shaped housing (1) having first and second arms defining first (4) and second (6) chambers, respectively, and a cross-connection element defining a third chamber (2) which supportably positions the first magnetization means (3), the first chamber (4) supportably positioning the second magnetization means (5),
   the first and second magnetization means being arranged on the same side of the contact means and being magnetically coupled thereto to act magnetically on the contact means, the first magnetization means being directionally magnetically polarized in substantially the same direction of magnetic bridging of the contact means,
   polarization means (12) associated with the first magnetization means to selectively polarize the first magnetization means to a first polarized condition to produce a first magnetic field additive to the second magnetic field to thereby develop a net magnetic field sufficient to activate the contact means; and to selectively polarize the first magnetization means to a second polarized condition to produce a first magnetic field subtractive to the second magnetic field to thereby develop a net magnetic field which is not sufficient to activate the contact means.

2. A magnetically actuable relay structure as recited in claim 1 further comprising a magnetic flux conductor supportably positioned in the second chamber, and wherein the contact means comprises first (14) and second (16) contact elements defining an air gap (14) therebetween; the first contact element (15) rigidly connected to the first arm, and magnetically coupled to the second (5) magnetization means; the second contact element (16) rigidly connected to the second arm, and magnetically coupled to the magnetic flux conductor (7).

3. A magnetically actuable relay structure comprising:
   first (44), second (45, 59) and third (46, 60) magnetization means to produce first, second, and third magnetic fields, respectively,
   first (48, 63) and second (49, 64) contact means,
   a support device (71, 72) to support the first, second, and third magnetization means, and the first and second contact means,
   the second magnetization means and the first contact means being arranged on one side of the first magnetization means; the third magnetization means and the second contact means being arranged on the other side of the first magnetization means; the first and second magnetization means and the first contact means being magnetically coupled, and the first and third magnetization means and the second contact means being magnetically coupled,
   repolarization means (43, 57) associated with the first magnetization means to selectively polarize the first magnetization means to first and second polarized conditions, the first and second polarized conditions producing oppositely polarized magnetic fields, and wherein the first polarized condition produces a first magnetic field additive to the second magnetic field to develop a first net magnetic field sufficient to activate the first contact means, and which is subtractive to the third magnetic field to develop a second net magnetic field which is not sufficient to activate the second contact means; and wherein the second polarized condition produces a first magnetic field which is additive to the third magnetic field to develop a third net magnetic field sufficient to activate the second contact means, and which is subtractive to the second magnetic field to develop a fourth net magnetic field which is not sufficient to activate the first contact means.

4. A magnetically actuable relay structure comprising: first (44), second (45, 59) and third (46, 60) magnetization means to produce first, second, and third magnetic fields, respectively, first (48, 63) and second (49, 64) contact means, a support device (71, 72) to support the first, second, and third magnetization means, and the first and second contact means, the second magnetization means and the first contact means being arranged on one side of the first magetization means; the third magnetization means and the second contact means being arranged on the other side of the first magnetization means; the first and second magnetization means and the first contact means being magnetically coupled, and the first and third magnetization means and the second contact means being magnetically coupled, repolarization means (43, 57) associated with the first magnetization means to selectively polarize the first magnetization means to first and second polarized conditions, the first and second polarized conditions producing oppositely polarized magnetic fields, and wherein the first polarized condition produces a first magnetic field which is additive to the second and third magnetic fields to develop first and second net magnetic fields which are sufficient to activate the first and second contact means, respectively; and to produce a first magnetic field which is subtractive to the second and third magnetic fields to develop first and second net magnetic fields which are not sufficient to activate the first and second contact means, respectively.

5. A magnetically actuable relay structure comprising:

first (44), second (45, 59) and third (46, 60) magnetization means to produce first, second, and third magnetic fields, respectively, first (48, 63) and second (49, 64) contact means, a support device (71, 72) to support the first, second and third magnetization means, and the first and second contact means, the support device comprising an H-shaped housing (71, 72) having first (42', 56) and second (42, 56') arms, joined by a cross-connection; the cross-connection supportably positioning the first magnetization means (44, 58); the first and second arms supportably positioning the first (48, 63) and second (48, 64) contact means therebetween; the second (45, 59) and third (46, 60) magnetization means being supported between the first magnetization means and the first and second contact means, respectively, the second magnetization means and the first contact means being arranged on one side of the first magnetization means; the third magnetization means and the second contact means being arranged on the other side of the first magnetization means; the first and second magnetization means and the first contact means being magnetically coupled, and the first and third magnetization means and the second contact means being magnetically coupled, repolarization means (43, 57) associated with the first magnetization means to selectively polarize the first magnetization means to first and second polarized conditions, the first and second polarized conditions producing oppositely polarized magnetic fields.

6. A magnetically actuable relay structure as recited in claim 5 wherein the second (45) and third (46) magnetization means are supportably positioned in the first arm (42').

the magnetic flux conductor (47) being supportably positioned in the second arm (42), magnetically coupling the first magnetization means to the first (48) and second (49) contact means.

7. A magnetically actuable relay structure as recited in claim 5 wherein the second (59) and third (60) magnetization means are supportably positioned in the first (56) and second (56') arms, respectively, magnetically coupling the first magnetization means (58) to the first (63) and second 64) contact means, respectively; and wherein first (61) and second (62) magnetic flux conductors are supportably connected in the first (56) and second (56') arms, respectively, magnetically coupling the first magnetization means (58) to the first (63) and second (64) contact means, respectively.

8. A magnetically actuable relay structure as recited in claim 10 wherein the first and second contact means each comprise first (50, 52, 65, 67) and second (51, 53, 66, 68) contact elements, the first contact elements being connected to the first arm, (42', 56) the second contact element being connected to the second arm (42, 56'), the first and second contact elements defining air gaps therebetween.

9. A magnetically actuable relay structure as recited in claim 8 wherein the first and second contact elements are positioned substantially parallel to the longitudinal axis of the first magnetization means (44, 58).

10. A magnetically actuable relay structure as recited in claim 3 wherein the repolarization means comprises an electrical winding (43, 57) wound around the first magnetization means.

11. A magnetically actuable relay structure as recited in claim 3 wherein the first and second contact means each comprise a plurality of associated first (30, 31) and second (32, 33) contact switches, arranged in substantially parallel alignment to the longitudinal axis of the first magnetization means (39).

12. A magnetically actuable relay structure as recited in claim 3 which further comprises a casing defining a plurality of individual chambers (19–23), a plurality of relay structures individually supported within said chambers, the casing comprising material which magnetically isolates the plurality of chambers from each other.

References Cited

UNITED STATES PATENTS

| 3,002,067 | 9/1961 | Baldwin et al. | 335—153 |
|---|---|---|---|
| 3,174,009 | 3/1965 | Deeg | 335—152 |
| 3,184,563 | 5/1965 | Myatt | 335—153 |

BERNARD A. GILHEANY, Primary Examiner

R. N. ENVALL, Jr., Assistant Examiner